United States Patent [19]
Miura

[11] Patent Number: 5,253,878
[45] Date of Patent: Oct. 19, 1993

[54] COMPRESSION RING FOR INTERNAL-COMBUSTION ENGINES

[75] Inventor: Takashi Miura, Kashiwazaki, Japan

[73] Assignee: Kabushiki Kaisha Riken, Tokyo, Japan

[21] Appl. No.: 889,393

[22] Filed: May 28, 1992

[30] Foreign Application Priority Data

Jun. 4, 1991 [JP] Japan .................. 3-159420

[51] Int. Cl.⁵ .............................................. F16J 9/14
[52] U.S. Cl. ..................................... 277/220; 277/221; 277/216
[58] Field of Search ............... 277/216, 220, 221, 222, 277/138

[56] References Cited

U.S. PATENT DOCUMENTS

| | | | |
|---|---|---|---|
| 1,548,609 | 8/1925 | Justice | 277/220 |
| 2,970,023 | 1/1961 | Thompson | 277/216 |
| 4,575,107 | 3/1986 | Umegawa | 277/222 |
| 4,848,212 | 7/1989 | Kawano et al. | 277/222 |

FOREIGN PATENT DOCUMENTS

| | | | |
|---|---|---|---|
| 0088850 | 5/1985 | Japan | 277/222 |
| 0298653 | 12/1990 | Japan | 277/216 |
| 2164418 | 3/1986 | United Kingdom | 277/221 |

*Primary Examiner*—William A. Cuchlinski, Jr.
*Assistant Examiner*—Daniel G. DePumpo
*Attorney, Agent, or Firm*—Shea & Gould

[57] ABSTRACT

A compression ring for an internal-combustion engine includes an outer circumferential surface and a lower circumferential surface which define a lower outer circumferential corner, a radially extending first butt end face having a circumferentially projecting rib, and a radially extending second butt end face opposing the first butt end face and having a circumferentially extending notch for receiving the rib. The lower outer circumferential corner portion has a cut-away portion extending along the entire circumference thereof except at portions contiguous to the first and second butt end faces.

10 Claims, 4 Drawing Sheets

COMPRESSION RING FOR INTERNAL-COMBUSTION ENGINES

BACKGROUND OF THE INVENTION

1. Field of the Invention

This invention relates to a compression ring for internal-combustion engines.

2. Description of the Prior Art

With regard to compression rings, which represent one type of piston ring for internal-combustion engines, various improvements in compression-ring sealability have been made for the purpose of preventing leakage of gas when a piston is acted upon by pressure.

An example of such a compression ring, the construction of which is shown in FIG. 9, is one having special butt ends. In this example, a compression ring 1 has two butt end faces one of which is formed to have a rib 2 projecting circumferentially from an upper outer circumferential side thereof. The rib 2 has a cross section in the shape of a right-angled triangle. The other butt end face of the compression ring 1 is formed to have a notch 3 in an upper outer circumferential side thereof. The notch 3 also has a cross section in the shape of a right-angled triangle and is capable of receiving the rib 2. The compression ring 1 is fitted snugly into the ring groove of a piston, in which state the two butt portions of the ring meet each other.

In order to improve the seal at the side face of the compression ring, the upper corner portion on the inner circumferential side of the compression ring is cut away along the entire circumference of the ring to form an inner cut. If the inner-cut portion, shown at numeral 4, extends to the slanting surfaces of the opposing butt end faces of the compression ring 1, as illustrated in FIG. 10, the gas or oil to be sealed in travels along the back surface of the ring 1 and escapes from the inner cut 4 through the gap between the rib 2 and the notch 3. The result is the same as that seen in a compression ring having the well-known stepped butt end faces, shown in FIG. 11, in which the two end faces of the ring are provided with steps 5 that engage each other. In FIG. 11, the arrow indicates the path along which a gas bleeds and escapes to the outside. Accordingly, it is required that the cross-sectional dimensions of the rib 2 be reduced in conformity with the size of the inner cut. However, a consequence of reducing the cross-sectional dimensions of the rib 2 can be a failure to obtain the requisite mechanical strength.

SUMMARY OF THE INVENTION

Accordingly, an object of the present invention is to provide a compression ring which solves the aforementioned problem encountered when a compression ring having special butt end faces of the above-described construction is provided with a inner cut that is for the purpose of producing torsion.

Another object of the present invention is to provide a compression in which a sufficiently large cross-section of the rib is obtained while still making it possible to produce the same amount of torsion and furnish butt end portions of the same construction as that described above.

According to the present invention, the foregoing objects are attained by providing a compression ring for an internal-combustion engine, comprising an outer circumferential surface, a lower circumferential surface, a radially extending first butt end face having having a circumferentially projecting rib, and a radially extending second butt end face opposing the first butt end face and having a circumferentially extending notch at a position corresponding to the rib for receiving the rib. The outer and lower circumferential surfaces define a lower outer circumferential corner portion formed to have a cut-away portion extending along the entire circumference thereof except at portions contiguous to the first and second butt end faces.

Thus, the compression ring according to the invention is characterized in that the lower outer circumferential corner of the ring is provided with a circumferentially extending cut-away portion. As a result, it is possible to produce torsion equivalent to that obtained when the upper inner circumferential portion of the conventional compression ring is provided with an inner cut, and the sealability at the side face of the compression ring can be improved. Since the cut-away portion is provided on the lower outer circumferential corner of the ring except at the butt end portions thereof, the cut-away portion does not interfere with slanting surfaces of the butt ends. This means that the rib can be afforded enough cross-sectional area for the requisite mechanical strength even when the cut-away portion has the required cross-sectional area.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described with reference to the accompanying drawings.

Figure 1:
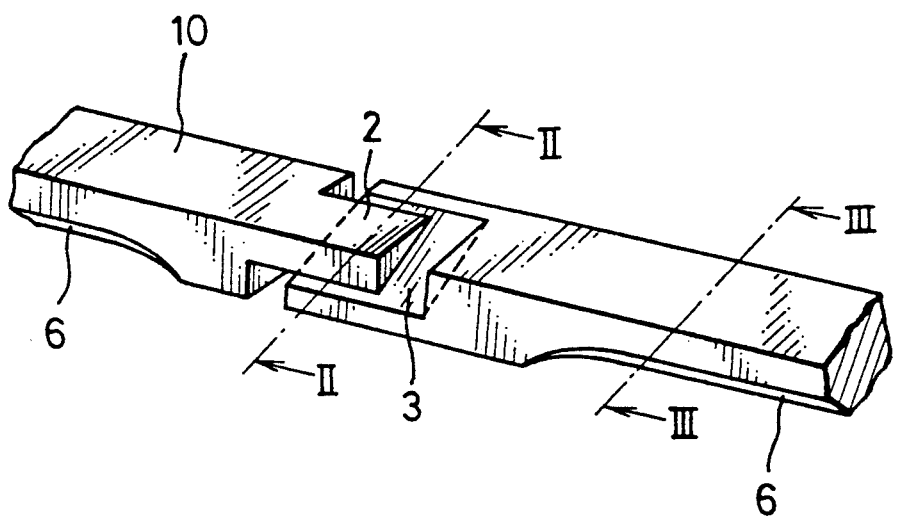
FIG. 1 is a perspective view illustrating the construction of butt end portions and portions in the vicinity thereof in an embodiment of a compression spring according to the present invention.
Figure 2:
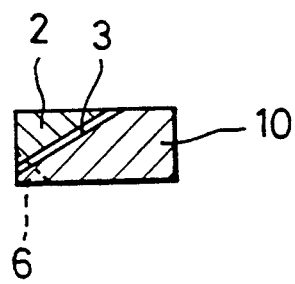
FIG. 2 is a sectional view taken along line II—II of FIG. 1.
Figure 3:
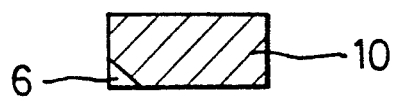
FIG. 3 is a sectional view taken along line III—III of FIG. 1.
Figure 9:
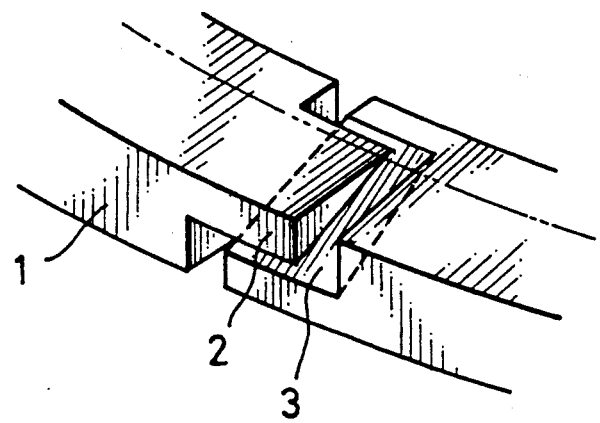
FIG. 9 is a perspective view showing the construction of special butt end portions of a compression ring.
Figure 10:
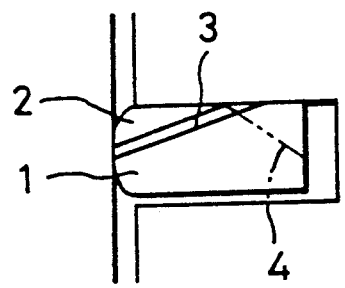
FIG. 10 is an explanatory view for describing a problem which arises when a compression ring having special butt end portions is provided with an inner cut.
Figure 11:
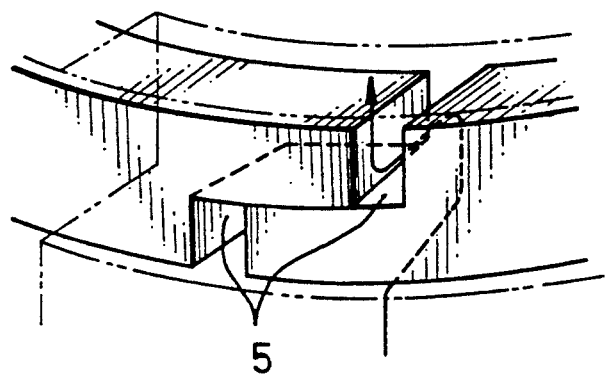
FIG. 11 is an explanatory view for describing a problem which arises in a compression spring having stepped butt end portions.

FIG. 1 is a perspective view illustrating the construction of butt end portions and portions in the vicinity thereof in an embodiment of a compression ring 10 according to the present invention. The compression ring 10 has butt end portions the configuration of which has been described in connection with FIG. 9. Specifically, the compression ring 10 has two butt end faces one of which is formed to have the rib 2 projecting circumferentially from the upper outer circumferential side thereof. The rib 2 has a cross section in the shape of a right-angled triangle. The other butt end face of the compression ring 1 is formed to have the notch 3 in an upper outer circumferential side thereof. The notch 3 also has a cross section in the shape of a right-angled triangle and is capable of receiving the rib 2. The compression ring 10 is fitted snugly into the ring groove of a piston, in which state the two butt portions of the ring meet each other. According to a feature of the present invention, the lower outer circumferential corner portion of the ring 10 with the exception of its butt end portions is provided with a circumferentially extending chamfered or cut-away portion 6. FIGS. 2 and 3 are sectional views of the compression ring 10 taken along lines II—II and III—III, respectively, of FIG. 1. It will be appreciated that the corner portion on the lower outer circumferential side of the ring 10 is chamfered over its entire length except for the portions at the butt ends, and that the resulting cut-away or chamfered portion 6 does not interfere with the slanting surfaces of the rib 2 and notch 3 at the butt ends of the ring. As a result, torsion the same as that obtained when the inner circumferential portion on the upper side of the ring was provided with the inner cut is produced in the compression ring 10, and the side face of the compression ring can be effectively sealed.

Figure 4:
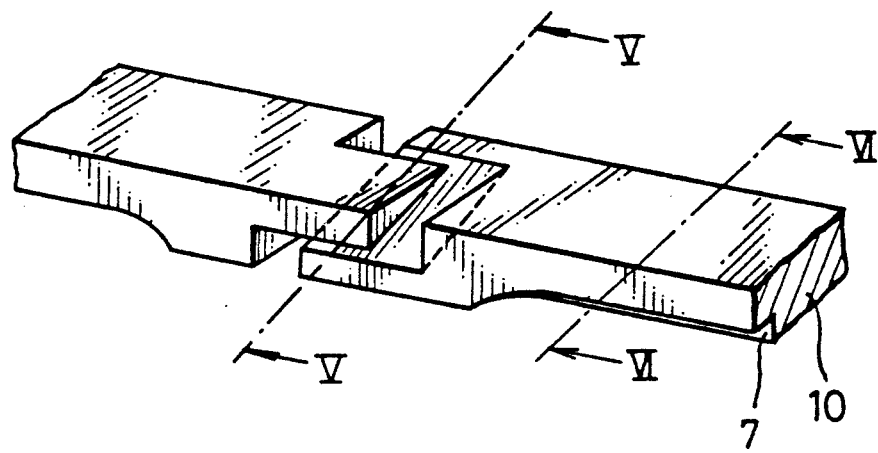
FIG. 4 is a perspective view illustrating the construction of butt end portions and portions in the vicinity thereof in another embodiment of a compression ring according to the present invention.
Figure 5:
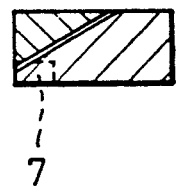
FIG. 5 is a sectional view taken along line V—V of FIG. 4.
Figure 6:
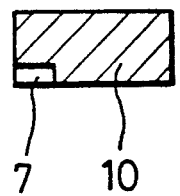
FIG. 6 is a sectional view taken along line VI—VI of FIG. 4.

FIG. 4 is a view showing another embodiment of the present invention. The corner portion on the lower outer circumferential side of the ring 10 is provided with a cut-away portion 7 over its entire length except for the portions at the butt ends. In this embodiment, the cut-away portion 7 has a rectangular cross section. In all other respects, this embodiment is identical with the embodiment of FIG. 1. FIGS. 5 and 6 are sectional views taken along lines V—V and VI—VI, respectively, of FIG. 4.

In both of the above-described embodiments, the cut-away portions 6, 7 at the corner portion of the ring do not interfere with the rib 2 and notch 3 at the butt ends. This makes it possible to provide the rib 2 with a sufficiently large cross-sectional area. This will be elucidated with regard to a specific example.

Figure 7:
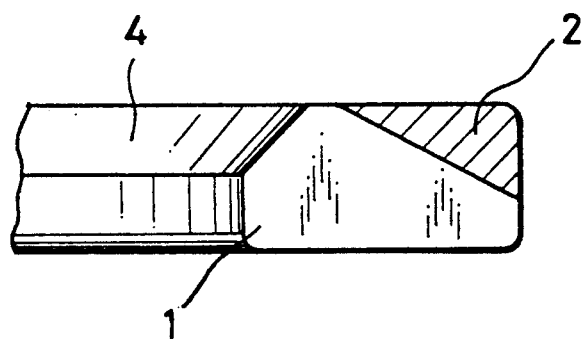
FIG. 7 is an explanatory view for describing the cross-sectional area of a rib of a special butt end according to a specific example of the prior art.

FIG. 7 is a view for describing the shape and dimensions of the rib 2 according to the prior art. In a case where a 0.55 mm inner cut 4 is provided in the upper inner circumferential corner portion of the compression ring 1, which has a cross section whose width and height are 3.3 mm and 1.5 mm, respectively, the width of the rib 2 is only 2.6 mm at most. If the height is assumed to be 1.1 mm, then the cross-sectional area of the projection 2 will be 1.43 mm$^2$.

Figure 8:
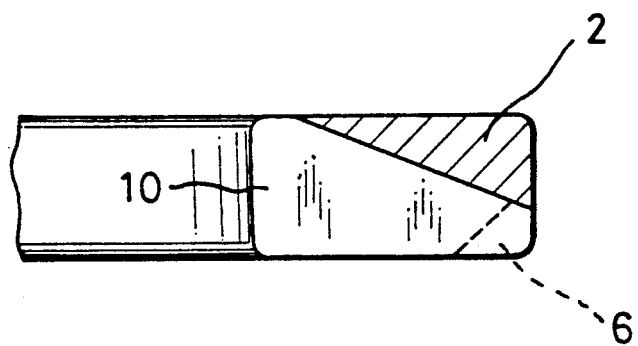
FIG. 8 is an explanatory view for describing the cross-sectional area of a rib of a special butt end according to a specific embodiment of the present invention.

FIG. 8 is a view for describing the shape and dimensions of the rib 2 according to the present invention. In this case, the upper inner circumferential corner portion at the butt ends of the compression ring has no inner cut, and therefore the width of the rib 2 can be made 3 mm. If the height is assumed to be 1.1 mm, the same as in the prior-art example above, then the cross-sectional area of the rib 2 will be 1.6 mm$^2$. Thus, the cross sectional area of the rib 2 can be made 15% larger than in the prior art.

Thus, in accordance with the present invention as described above, the cross-sectional area of the rib at the butt ends of a compression ring can be made larger than in the prior art, even when the compression ring is provided with a cut-away portion to produce torsion in the ring. As a result, sealability at the side face of the compression ring can be improved and the mechanical strength of the butt ends can be increased.

As many apparently widely different embodiments of the present invention can be made without departing from the spirit and scope thereof, it is to be understood that the invention is not limited to the specific embodiments thereof except as defined in the appended claims.

What is claimed is:

1. A compression ring for an internal-combustion engine, comprising:
   an outer circumferential surface;
   a lower circumferential surface;
   a radially extending first butt end face having a circumferentially projecting rib; and
   a radially extending second butt end face opposing said first butt end face and having a circumferentially extending notch at a position corresponding to said rib for receiving said rib, said rib overlapping with said notch in a circumferential direction so as to define an overlap circumferential portion separate from a remaining circumferential portion;
   said outer and lower circumferential surfaces defining a lower outer circumferential corner portion formed to have a cut-away portion extending between first and second circumferential points disposed within said remaining circumferential portion, said cut-away portion extending around said compression ring within said remaining circumferential portion and without extending into said overlap circumferential portion.

2. The compression ring according to claim 1, wherein said cut-away portion is formed by chamfering.

3. The compression ring according to claim 1, wherein said cut-away portion is formed by an undercut.

4. The compression ring according to claim 1, wherein said circumferentially projecting rib has a triangular cross section.

5. The compression ring according to claim 4, wherein said cross section is in the shape of a right-angled triangle.

6. The compression ring according to claim 5, wherein said circumferentially extending notch has a cross section in the shape of a right-angled triangle.

7. The compression ring according to claim 1, wherein said cut-away portion has a triangular cross section.

8. The compression ring according to claim 1, wherein said cut-away portion has a rectangular cross section.

9. The compression ring according to claim 6, wherein said first and second butt end faces have rectangular cross sections.

10. The compression ring according to claim 1, further comprising an upper circumferential surface and wherein said upper and outer circumferential surfaces define an upper outer circumferential corner portion formed to have said circumferentially extending notch extending within said overlap circumferential portion.

* * * * *